Dec. 23, 1958   E. P. D'AZZO   2,865,587
DEVICE FOR CLAMPING A PIPE TO A STRUCTURAL MEMBER
Filed July 13, 1956
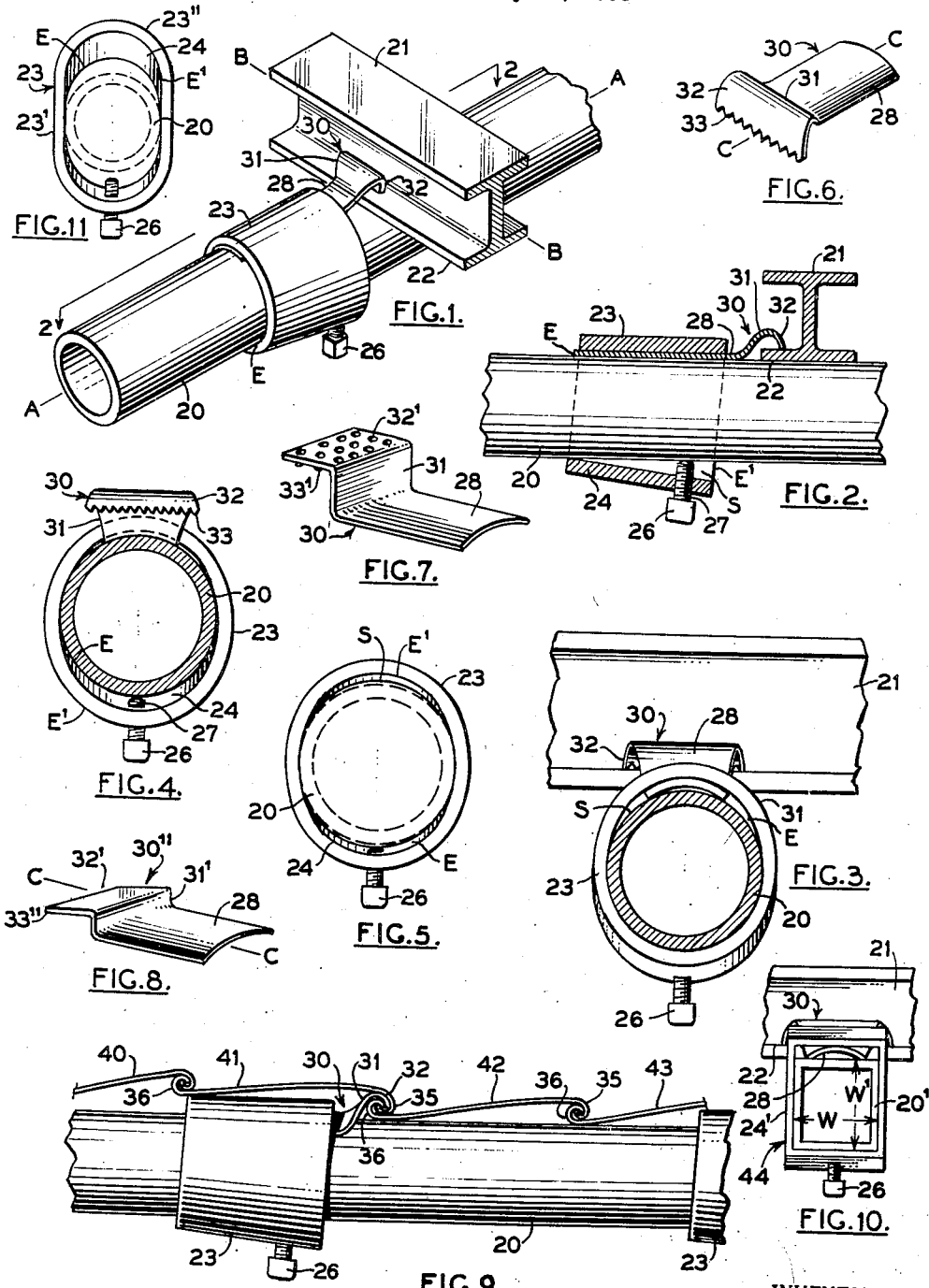
INVENTOR.
ERROL P. D'AZZO
BY
J. B. Burke
ATTORNEY United States Patent Office 2,865,587
Patented Dec. 23, 1958

2,865,587

DEVICE FOR CLAMPING A PIPE TO A STRUCTURAL MEMBER

Errol P. D'Azzo, New York, N. Y.

Application July 13, 1956, Serial No. 597,620

6 Claims. (Cl. 248—72)

This invention relates to the art of pipe joints and fittings and particularly concerns a clamp and clip for rigidly joining a pipe and a right angularly disposed structural member in a quickly attachable and detachable assembly.

Heretofore joints of the general character mentioned above have employed C-clamps, and relatively complicated or expensive pipe fittings. The prior pipe fittings have usually been capable of clamping only one size, shape or type of structural member to a round or square pipe. Some prior fittings require drilling or punching of holes, tapping threads in drilled holes, and other difficult, expensive and time consuming operations.

In the present invention the foregoing difficulties and disadvantages have been overcome by providing a novel clamping and clip means adapted to attach one elongated member of one type to another elongated member of another type, with the members disposed at right angles to each other.

It is therefore a principal object of the invention to provide a novel T-joint structure.

It is a further object to provide an adjustable clamping means and a coacting form fitting clip means for a T-joint structural assembly.

It is a further object to provide a clamping means in the form of a collar on sleeve having a tapered bore, with threaded means disposed near the wider end of the bore.

It is a further object to provide a clamping means in the form of a collar or sleeve having a tapered bore of generally elliptical or rectangular cross-section.

It is a further object to provide a clamping means of one of the types mentioned for engaging a first elongated structural member, and a clip means adapted to grip another structural member disposed at right angles thereto in a T-joint, the clip means being retained by the clamping means and first structural member.

It is a further object to provide a clip means in the form of a curved blade-like element having an end portion adapted to grip one surface of a structural member.

It is a further object to provide a clip means of the type described wherein one end is formed with teeth, prongs, or other means for gripping a smooth surface of a structural member.

Other and further objects and advantages will become apparent from the following description taken together with the drawing, wherein:

Fig. 1 is a perspective view of an assembled device embodying the invention.

Fig. 2 is a central longitudinal section taken on line 2—2 of Fig. 1.

Fig. 3 is an end elevational view of the assembly of Fig. 1.

Fig. 4 is an end elevational view of the clamping and clip members.

Fig. 5 is an end view of a clamping member.

Figs. 6, 7, 8 are perspective views of various forms of clip members.

Fig. 9 is a side view of an assembled device according to the invention arranged for joining a ribbed plate structure to a supporting pipe.

Fig. 10 is an end view of another form of assembled device according to the invention.

Fig. 11 is an end view of a clamping member.

In Figs. 1, 2, 3 are shown a cylindrical pipe 20 whose longitudinal axis A—A is disposed perpendicular to a structural member such as I-beam 21. The beam has a flat plate portion 22 resting on the pipe. The longitudinal axis B—B of the beam is disposed perpendicular to axis A—A. Mounted on the pipe 20 is a clamping member 23 in the form of a collar or sleeve. This clamping member as best shown in Figs. 3, 4 and 5 has a generally elliptical cross section. The clamping member has a hollow tapered substantially elliptical bore 24. The narrow end E of the bore has a minor axis substantially equal to the diameter of pipe 20 and a major axis slightly larger than the diameter of the pipe. The wider end E' of the bore 24 has a minor axis substantially equal to the external diameter of the pipe 20 and a major axis greater than the major axis of the other end E of the bore. A bolt 26 is threaded in an aperture 27 near the end E' of the bore 24. There is thus provided a space S between the wider end of the bore and the pipe 20. In this space, fits the curved body portion 28 of a clip member 30. This clip as best shown in Fig. 6 has an offset portion 31 and a depending curved jaw 32. The linear end of the jaw has serrations 33 arranged to bear on the flat plate portion 22 of beam 21. The jaw is curved to define a portion of a cylinder. The body 28 is also curved to define a portion of a cylinder. The longitudinal axes of the body and jaw are disposed perpendicular to each other. When the bolt 26 is tightened as shown in Fig. 2 the clamp member 23 forces the flexible or compliant body 28 against the pipe and the teeth of jaw 32 grip the plate 22 so that the beam 21 is firmly held to the pipe 20.

In Fig. 11 a preferred shape of clamping member 23 is shown in an end view. The sides 23' are substantially straight and the ends 23" are curved. The bore 24 at its end E' thus has straight sides with ends having a curvature substantially the same as the external curvature of the pipe 20. The smaller end E of bore 24 likewise has straight sides with ends having a curvature substantially the same as the external curvature of pipe 20. This shape of bore is preferred to one which is exactly elliptical because the straight sides of the bore have better engagement with the pipe 20 and the curved ends of the bore fit more snugly on the pipe 20 with the body portion 28 of the clip therebetween. The distance between sides 23' is substantially equal to the width of pipe 20.

In Fig. 4 is shown an end view of the clamping member 23 and the clip 30, looking from the end E' to the end E of the bore 24.

In Fig. 5 is shown an end view of the clamping member 23 and pipe 20 with clip 30 omitted. This figure clearly shows the space S provided between bore 24 and the exterior of pipe 20 for insertion of clip 30.

Fig. 3 is an end view of the assembly with bolt 26 loosened so that the body portion 28 of the clip 30 is loosely held in the space S. All other portions of the assembly are numbered to correspond with Figs. 1 and 2. In Fig. 2 the bolt 26 is shown fully tightened so that the serrated end of clip 30 bears down on the flat portion 22 of the beam 21.

In Fig. 9 the beam 21 is replaced by a chain assembly of long slats 40—43 having curled ends. The curled end 35 of each slat extends over and into the substantially curved end 36 of the adjacent slat. The slats are arranged with curled ends 36 resting on pipe 20 or clamping member 23 as shown in Fig. 9. Clip 30 has its curved jaw 32 engaged in the curled end 35 of slat 41 and in the interposed end 36 of slat 42. The curvature of the offset end 32 of the clip corresponds to the curvatures of the ends of the slats so that the slats are held firmly to the pipe 20. A plurality of clips 30 and clamping members 23 will be disposed at spaced intervals along pipe 20 so that a long succession or chain of slats may be firmly attached to pipe 20 by a quickly detachable means.

In Fig. 7 the clip 30' has jaw 32' formed as a substantially flat plate with projections 33' distributed thereover. Offset portion 31 is substantially flat and extends almost perpendicular to the longitudinal axis of curved portion 28. This arrangement is a contrast to the structure of the clip 30" in Fig. 8 where the offset portion 31' is considerably shorter than the offset portion shown in Fig. 7. The projections 33' are omitted from plate 32' which extends perpendicular to offset portion 31' and at a slight angle to the axis C—C of body portion 28. When the clip 30" of Fig. 8 is used the sharp linear end 33" of jaw 32' serves as a gripping or toothed element on plate 22 when the bolt 26 is tightened.

In Fig. 10 is shown a modification of the invention wherein pipe 20' is rectangular or square in cross-section. The bore 24' is rectangular in cross-section with a width W equal to the external width of the pipe 20'. The longer dimensions of both ends of bore 24 are longer than the width F' of the pipe. The rectangular clamping member 44 shown in Fig. 10 has a tapered bore with rectangular ends. Any one of clips 30, 30', or 30" may be used with clamping member 44 to secure the beam 21 to the pipe 20'. The clamping and clip members shown in Fig. 10 may be used with the chain of slats 40—43 shown in Fig. 9 to secure these slats to the pipe 20.

If desired the clamping member and clip in each of the embodiments shown and described may be formed as a single integral unit.

Although there has been illustrated and described certain preferred embodiments of the invention it will be understood that many changes and modifications may be made within the scope of the invention as defined in the appended claims.

What is claimed is:

1. A clamping device comprising a cylindrical pipe, a clamping member encircling said pipe, said clamping member having a tapered bore, said bore having a cross-section of greater length than width, the width of the bore being substantially equal to the width of the pipe, a structural member resting on said pipe, and a clip having a curved body and a jaw, said body being disposed in said bore between said clamping member and said pipe, said jaw bearing on the structural member, said clamping member having tightening means whereby the structural member is held by the clip in a fixed position with respect to said pipe.

2. A clamping device comprising a rectangular pipe, a rectangular clamping member encircling said pipe, said clamping member having a tapered bore, said bore having a cross-section of greater length than width, the width of the bore being substantially equal to the width of the pipe, a structural member resting on said pipe, and a clip having a curved body and a jaw, said body being disposed in said bore between said clamping member and said pipe, said jaw bearing on the structural member, said clamping member having tightening means whereby the structural member is held by the clip in a fixed position with respect to said pipe.

3. A clamping device comprising a cylindrical pipe, a clamping member encircling said pipe, said clamping member having a tapered bore, said bore having a substantially elliptical cross-section, the width of the bore being substantially equal to the width of the pipe from end to end of the bore, a structural member resting on said pipe, and a clip having a curved body and a jaw, said body being disposed in said bore between said clamping member and said pipe, said jaw bearing on the structural member, said clamping member having tightening means whereby the structural member is held by the clip in a fixed position with respect to said pipe.

4. A clamping device, comprising a pipe, a clamping member encircling said pipe, a structural member resting on said pipe, and a clip, said clip having a body and a curved jaw, said body being disposed between said clamping member and said pipe, said jaw bearing on the structural member, said clamping member having tightening means for holding the body against the pipe and for holding the jaw against the structural member, said structural member having a curled end, said curled end having an axis disposed transversely to the longitudinal axis of the pipe, with the curved jaw engaging the curled end of the structural member.

5. A clamping device, comprising a cylindrical pipe, a collar encircling said pipe, said collar having a tapered bore, said bore having a cross section of greater length than width, the width of the bore being substantially equal to the width of the pipe, an elongated structural member disposed in contact with the pipe, the pipe and member having longitudinal axes disposed perpendicular to each other, a clip having a curved body and a jaw extending therefrom, said body being disposed in said bore between said collar and said pipe, said jaw bearing on the structural member, and a set screw extending through the collar into the bore for contacting the pipe, whereby the structural member will be held by the clip in a fixed position with respect to the pipe when said set screw is tightened in the collar against the pipe.

6. A device for clamping a cylindrical pipe to an elongated structural member with longitudinal axes of the pipe and structural member disposed perpendicular to each other, comprising a collar for encircling said pipe, said collar having a tapered bore, said bore having a cross-section of greater length than width, the width of the bore being substantially equal to the width of the pipe, a clip having a curved body and a jaw, said body being disposed in the collar for contact with the pipe, said jaw extending beyond the collar for bearing on the structural member, and a set screw adjustably extendable through the collar into the bore for contacting the pipe, whereby the structural member will be held by the clip in a fixed position with respect to the pipe when said set screw is tightened in the collar against the pipe.

References Cited in the file of this patent

UNITED STATES PATENTS

| | | |
|---|---|---|
| 2,309,189 | Hancock et al. | Jan. 26, 1943 |
| 2,385,209 | Joyce | Sept. 18, 1945 |
| 2,617,618 | Blume | Nov. 11, 1952 |
| 2,733,034 | Tormo | Jan. 31, 1956 |